Nov. 2, 1937.  J. S. WHEELWRIGHT  2,098,118
PRINTING UPON POROUS SHEET MATERIAL
Filed July 16, 1935
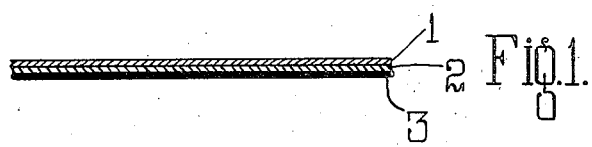
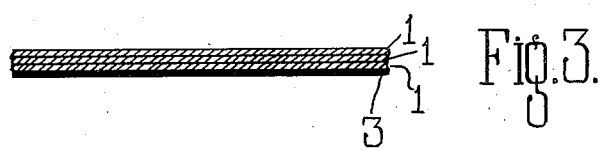
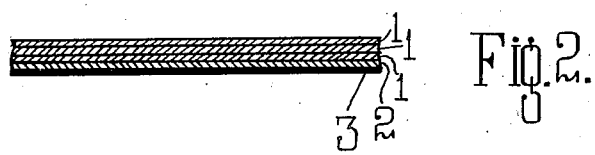
Inventor:
John S. Wheelwright
By: Mason & Porter
Attorneys Patented Nov. 2, 1937

2,098,118

UNITED STATES PATENT OFFICE 2,098,118

PRINTING UPON POROUS SHEET MATERIAL

John Sylvester Wheelwright, Tonbridge, England, assignor to J. S. Wheelwright Limited, London, England, a British company Application July 16, 1935, Serial No. 31,674
In Great Britain July 17, 1934

1 Claim. (Cl. 101—426)

This invention relates to printing upon porous sheet material, for example, textile fabrics.

In order to mount sheet material to be printed, for example, by means of stencils of permeable material, on a printing bed, (or on a travelling conveyor whereby it is carried past the stencils or other printing devices), it has been proposed to provide the printing bed, (or the conveyor), and the material to be printed each with a waterproof surface, to damp one of said waterproof surfaces, and then to lay the material to be printed on the printing bed, or on the conveyor, with its waterproof surface opposed to that of the printing bed or conveyor to which it then adheres by suction. The waterproof surface on the material to be printed can be most conveniently provided by uniting that material by means of adhesive to a layer of waterproof material. This method of mounting sheet material on a support for printing purposes is described in the United States Letters Patent No. 2,017,706, filed November 29, 1933, and the present invention is concerned therewith.

It has been found when printing some kinds of fabrics, that difficulty is experienced in applying exactly the right amount of pigment so that while thoroughly impregnating the fabric, so much will not be applied as to cause the pigment to spread when it comes in contact with the waterproof layer with the result that the printing will be blurred. The object of the present invention is to provide means for obviating this risk.

Accordingly, the invention provides an improved method of preparing porous sheet material, for example textile fabrics in web form, so as to permit it to be mounted by the method referred to above on a support, for example a printing bed or a conveyor belt, for printing purposes which comprises the step of interposing a layer of absorbent material between the material to be printed and the aforesaid waterproof layer. This method may be carried out, for example, by applying to the material to be printed a layer of absorbent material, for example cotton cloth, and providing a waterproof surface on the outer face of the absorbent material.

Alternatively, a number of sheets of absorbent material may be secured together, for instance by gum, which sheets of material may, some or all, be the sheets to be printed, and consist of silk, cotton, or the like textile fabric.

Preferably, the waterproof surface on the absorbent material is provided by uniting thereto a layer of waterproof material in sheet form.

The intermediate layer of absorbent material will absorb any excess pigment and thus the risk of blurring will be considerably minimized.

Referring to the drawing:—

Figure 1 shows diagrammatically a method of printing porous textile material in which a sheet or web of such material 1 for instance silk or cotton fabric taken by way of example is gummed on one face to a sheet or web of absorbent material such as cotton felt 2 which is similarly secured to a waterproof sheet 3.

One or more sheets or webs 1 may be secured by gumming to each other and then to an absorbent layer 2 backed by a waterproof layer as shown in Figure 2 or the absorbent layer 2 may be omitted and a number of sheets or webs 1 of material to simultaneously receive a printing impression may be secured by gumming to one another, the lowermost web or sheet adhering to a waterproof web or sheet 3, as shown in Figure 3.

Instead of providing a separate waterproof web 3, either the under surface of the porous web or sheet 2, or the under surface of the lowermost textile web or sheet 1 of a number of such webs or sheets may have a waterproof coating applied to it.

It should here be mentioned that it is known to provide textile fabrics, which are to be printed in roller printing machines, with a backing of absorbent cotton cloth to prevent the endless band of felted or rubber covered cloth which passes around the pressure roller from being soiled by any pigment which may pass through the fabric being printed.

To carry out the invention in practice, a web of absorbent material can be lightly coated with adhesive on both sides by means of adhesive-applying rollers and then fed between a web of the material to be printed and a web of waterproof material. The three webs are then fed together through a calender and are thus united in one operation.

The invention also includes porous sheet material, for example textile fabrics in web form, when provided with a backing of absorbent material having an outer waterproof surface, for example provided by a layer of waterproof material united to the absorbent material.

I declare that what I claim is:—

A method of printing porous sheet material consisting in uniting a plurality of porous sheets in surface contact with one another by means of gum uniting the lowermost sheet by gum to a non-porous sheet and applying a colour medium to certain portions of the surface of the top sheet in quantity sufficient to penetrate all the sheets.

JOHN SYLVESTER WHEELWRIGHT.